(12) United States Patent
Carper et al.

(10) Patent No.: US 7,329,101 B2
(45) Date of Patent: Feb. 12, 2008

(54) CERAMIC COMPOSITE WITH INTEGRATED COMPLIANCE/WEAR LAYER

(75) Inventors: Douglas Melton Carper, Trenton, OH (US); Suresh Subramanian, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/025,222

(22) Filed: Dec. 29, 2004

(65) Prior Publication Data

US 2006/0140771 A1    Jun. 29, 2006

(51) Int. Cl.
*F01D 5/30* (2006.01)
(52) U.S. Cl. .................................. 416/219 R
(58) Field of Classification Search ............ 416/222 R, 416/241 B, 241 R, 248
See application file for complete search history.

(56) References Cited

U.S. PATENT DOCUMENTS

| | | | |
|---|---|---|---|
| 3,756,745 A | 9/1973 | Alver et al. | |
| 3,771,592 A | 11/1973 | Sayers | |
| 4,290,510 A | 9/1981 | Warren | |
| 4,626,476 A | 12/1986 | Londry et al. | |
| 4,647,494 A | 3/1987 | Meyerson et al. | |
| 4,710,425 A | 12/1987 | Baldoni, II et al. | |
| 4,766,013 A | 8/1988 | Warren | |
| 4,919,991 A | 4/1990 | Gadkaree | |
| 5,015,540 A | 5/1991 | Borom et al. | |
| 5,024,884 A | 6/1991 | Otfinoski | |
| 5,137,852 A | 8/1992 | Morgan et al. | |
| 5,139,876 A | 8/1992 | Graham et al. | |
| RE34,173 E * | 2/1993 | Kerber | 428/610 |
| 5,266,415 A | 11/1993 | Newkirk et al. | |
| 5,330,854 A | 7/1994 | Singh et al. | |
| 5,340,280 A | 8/1994 | Schilling | |
| 5,384,171 A | 1/1995 | Prucher | |
| 5,573,377 A | 11/1996 | Bond et al. | |
| 5,612,265 A | 3/1997 | Bullock et al. | |
| 5,990,025 A * | 11/1999 | Suyama et al. | 501/92 |
| 6,235,370 B1 | 5/2001 | Merrill et al. | |
| 6,265,078 B1 | 7/2001 | Atmur et al. | |
| 6,287,711 B1 | 9/2001 | Nieh et al. | |
| 6,322,889 B1 | 11/2001 | Lara-Curzio et al. | |
| 6,332,490 B1 | 12/2001 | Griggs | |
| 6,398,499 B1 * | 6/2002 | Simonetti et al. | 416/193 A |
| 6,500,557 B1 | 12/2002 | Koizumi et al. | |
| 6,726,448 B2 | 4/2004 | McGrath et al. | |
| 2003/0207155 A1 * | 11/2003 | Morrison et al. | 428/699 |

FOREIGN PATENT DOCUMENTS

WO    WO 02/092536 A1    11/2002

* cited by examiner

*Primary Examiner*—Edward K. Look
*Assistant Examiner*—Nathan Wiehe
(74) *Attorney, Agent, or Firm*—McNees Wallace & Nurick LLC

(57) ABSTRACT

The integral layer provides a ductile interface for attachment locations of a turbine engine component where a metallic surface is adjacent the attachment location. The ductile layer provides a favorable load distribution through the composite at the attachment location, and eliminates the need for a metallic shim.

11 Claims, 6 Drawing Sheets

CERAMIC COMPOSITE WITH INTEGRATED COMPLIANCE/WEAR LAYER

STATEMENT REGARDING FEDERALLY SPONSORED RESEARCH OR DEVELOPMENT

This invention was made with government support under Contract No. N00421-00-3-0536. The United States government may have certain rights to the invention.

FIELD OF THE INVENTION

The present invention relates generally to ceramic matrix turbine engine components, and more particularly, to an interface layer integrated into the ceramic composite during manufacture to reduce wear and provide a more favorable load distribution.

BACKGROUND OF THE INVENTION

A number of techniques have been used in the past to manufacture turbine engine components, such as turbine blades using ceramic matrix composites (CMC). One method of manufacturing CMC components, set forth in U.S. Pat. Nos. 5,015,540; 5,330,854; and 5,336,350; incorporated herein by reference and assigned to the Assignee of the present invention, relates to the production of silicon carbide matrix composites containing fibrous material that is infiltrated with molten silicon, herein referred to as the Silcomp process. The fibers generally have diameters of about 140 micrometers or greater, which prevents intricate, complex shapes, such as turbine blade components, to be manufactured by the Silcomp process.

Another technique of manufacturing CMC turbine blades is the method known as the slurry cast melt infiltration (MI) process. A technical description of such a slurry cast MI method is described in detail in U.S. Pat. No. 6,280,550 B1, which is assigned to one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave.

Generally, such turbine components require attachment to adjoining metallic hardware and/or metallic surfaces. Two disadvantages associated with attaching a CMC to metallic hardware are the wear of the metallic hardware by the hard, abrasive ceramic material surface, and the lack of load distribution in the CMC. Load distribution is critical in blade dovetail/disk interfaces. Typically, metallic shims or ceramic cloth have been interposed between the CMC and metallic surfaces to improve load distribution. Wear is typically handled by the application of coatings to the metallic hardware or coatings to the blade attachment surfaces as set forth in U.S. Pat. No. 5,573,377, incorporated herein by reference and assigned to the Assignee of the present invention.

What is needed is a method of manufacturing CMC turbine engine components that provides an interface layer on the CMC to improve load distribution within the CMC and reduce metallic wear. A favorable method would apply the interface layer during densification of the CMC.

SUMMARY OF THE INVENTION

Improvements in manufacturing technology and materials are the keys to increased performance and reduced costs for many articles. As an example, continuing and often interrelated improvements in processes and materials have resulted in major increases in the performance of aircraft gas turbine engines, such as the improvements of the present invention. The present invention is directed to a method for manufacturing a turbine engine component made from a ceramic matrix composite (CMC) by incorporating an interface layer into the attachment contacting surfaces of the CMC and the resulting turbine engine component. The present invention produces a component that does not require attachment hardware to be wear coated and eliminates the need for load distributing shims during manufacture, thereby improving the functionality of the component.

The present invention is directed to a turbine engine component including a body composed of a ceramic matrix material. The body includes an attachment location, the attachment location defining at least a portion of a surface of the component, and the attachment location being configured to be adjacent a second turbine engine component during operation of a turbine engine. An interface layer defines at least a portion of the surface of the attachment location and has a matrix side and an outer side. The interface layer is interposed between the body and the second turbine engine component during operation of a turbine engine, the matrix side of the interface layer being metallurgically bonded to the body.

The present invention is also directed to a method of manufacturing a turbine engine component that includes the steps of: providing a plurality of ceramic fibers; coating a preselected portion of the fibers with a layer of boron nitride to form a plurality of coated fibers, wherein the coating includes using chemical vapor infiltration; laying up the plurality of fibers in a preselected arrangement to form a component preform; partially infiltrating the component preform using a carbon-containing slurry; further infiltrating the component preform with at least silicon to form a ceramic matrix composite aircraft engine component; and bonding an interface layer to an attachment location defined by a surface of the ceramic matrix composite aircraft engine component, wherein the interface layer contains at least silicon.

The present invention is further directed to a method of manufacturing a ceramic matrix composite aircraft engine component. The method includes the steps of: providing a plurality of unidirectional prepreg ceramic fiber plies, the plies comprising coated prepreg ceramic fiber tows; laying up the plurality of prepreg ceramic fiber plies in a preselected arrangement to form a component shape; overlying at least a portion of the outside surface of the component shape with at least one matrix ply; heating the component shape to form a preform; infiltrating the preform with at least silicon to form a ceramic matrix composite component, wherein the component includes an attachment area defining a surface of the component; and forming an interface layer on the attachment area, wherein the interface layer includes at least silicon, and the interface layer and the attachment area are integrated.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
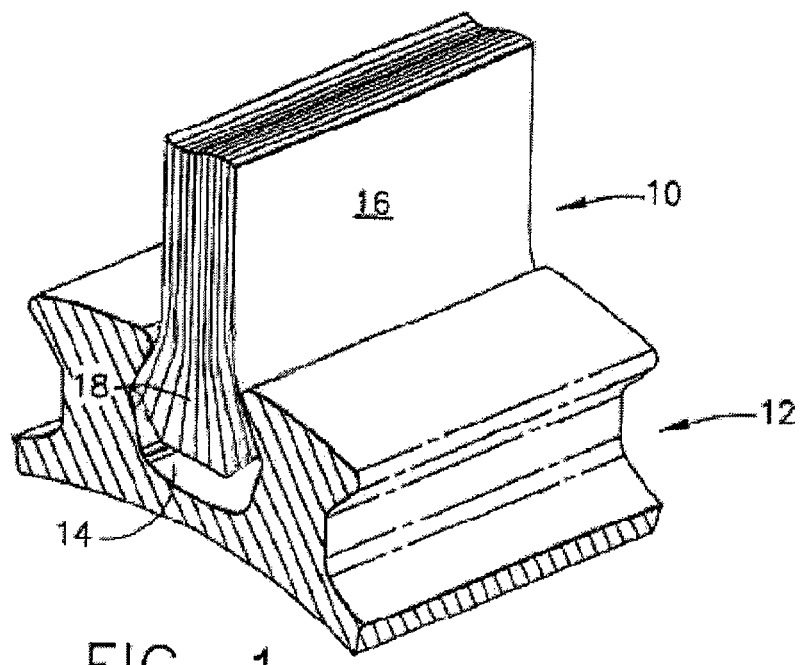
FIG. 1 is an exemplary partial sectional perspective view of a composite blade of the present invention assembled in a dovetail slot of a gas turbine engine rotor.

FIG. 1 depicts an exemplary aircraft engine blade 10. In this illustration, a turbine blade 10 is constructed of a ceramic matrix composite material. The turbine blade 10 is mounted to a turbine disk 12 in a dovetail slot 14. The turbine blade 10 includes an airfoil 16, against which a flow of hot exhaust gas is directed, and a dovetail 18, also referred has a root or splayed base, that extends from the airfoil 16 and engages the dovetail slot 14.

Figure 2:
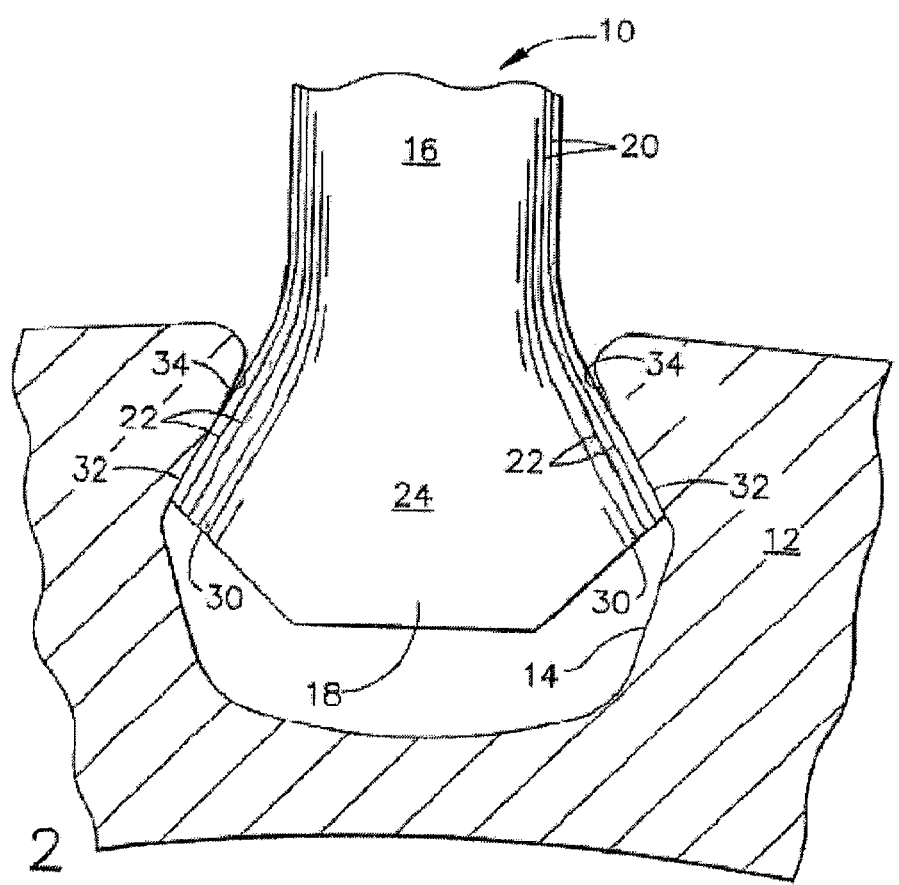
FIG. 2 is a partial sectional view of the blade and rotor of FIG. 1 of the present invention.

Referring now to FIG. 2, which is an example of an enlarged sectional view of a CMC blade 10 and disk 12, the contacting surfaces thereon are described in greater detail. The blade 10 includes a plurality of plies, 20 and 22, which have been, bonded together, such as by processes well known in the art. Plies 22 are bonded to a root core 24. The lower end of blade 10 is defined in part by a root surface 30 and a matrix surface 32. Dovetail slot 14 of disk 12 is defined by a mating surface 34.

Figure 3:
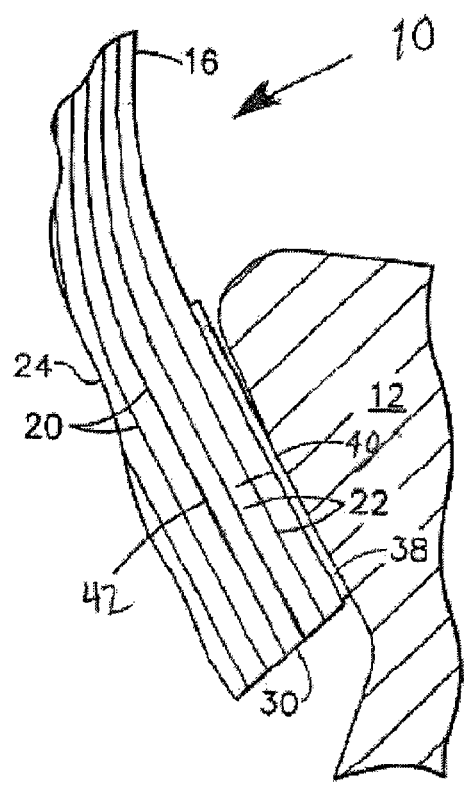
FIG. 3 is an enlarged partial sectional view of the blade and rotor of FIG. 1, illustrating the interface layer, exaggerated for clarity, of the present invention.

FIG. 3 illustrates a portion of the blade 10 and disk 12 portions of FIG. 2 to include an interface layer 38 defined by an outer surface 40, or side, and a matrix surface 42, or side. The matrix surface 42 faces the surface of blade 10. Interface layer 38 is interposed between blade 10 and disk 12 such that outer surface 40 and mating surface 34 of disk 12 bindingly contact. Interface layer 38 is preferably integrated to dovetail 18 of the blade 10, as discussed herein. The interface layer 38 may be composed of silicon. Alternatively, the interface layer 38 can include a gradient layering of SiC and silicon. Preferably, the concentration of silicon toward the outer surface 40 is increased in comparison to the matrix surface 42, silicon being of a lesser degree of hardness than the blade 10. Preferably, outer surface 40 is composed of up to about 80 percent silicon. However, the concentration of silicon can range from about 20 to about 80 percent by volume, and can additionally include other materials, such as boron nitride (BN), silicon carbide (SiC), molybdenum disilicide ($MoSi_2$) to comprise the remainder. The methods by which these materials are applied and their constructions will be discussed in additional detail below.

Figure 4:
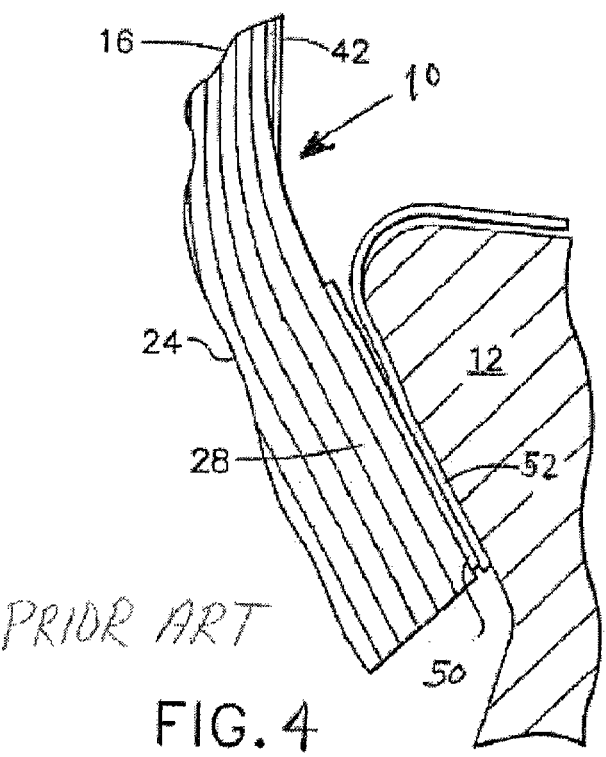
FIG. 4 is similar to FIG. 3, but illustrating a prior art wear coating and shim.

As shown in FIG. 4, a prior art assembly of a blade and disk is illustrated to include a wear coat 50 and a shim 52. Typically, a wear coat 50 is applied to the dovetail mating portion of a blade 10 due to the differences in surface hardness of blades and disks that promote wear on the softer surface. A shim 52 may also be present to reduce wear or to provide a more favorable load distribution between blade 10 and disk 12.

Figure 5:
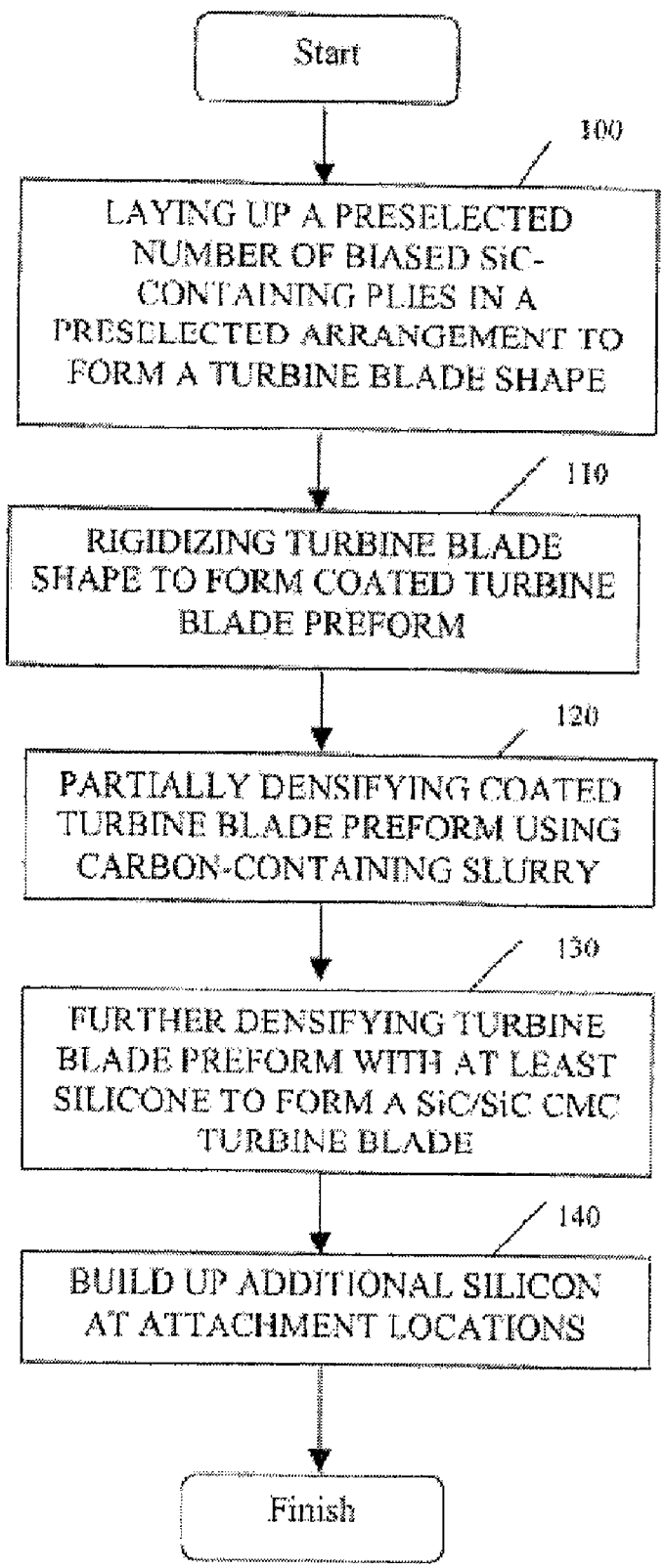
FIG. 5 is a flow chart illustrating a slurry cast MI method of manufacture of the present invention to produce a CMC turbine blade with an integral interface layer.

FIG. 5 is a flow chart illustrating a slurry cast MI method of manufacture of the present invention to produce a component for use in a heated environment, such as a CMC turbine blade. Heated environment, as used herein refers to temperatures in excess of at least 1,000° F. The initial step 100 of the process preferably includes laying up a preselected number of biased SiC-containing cloth plies of preselected geometry in a preselected arrangement to form a turbine blade shape. In a preferred embodiment, there are a preselected number of fiber tows woven in the weft direction, the woven tows being sufficient to allow the SiC cloth to be handled and laid up without falling apart.

Once the plies are laid up, the next step 110 includes rigidizing the turbine blade shape by applying boron nitride (BN), using a chemical vapor infiltration (CVI) process as is known in the art, forming a rigid coated turbine blade preform. In an alternate embodiment, an additional layer(s) of silicon doped boron nitride (Si-doped BN) or siliconized BN, silicon nitride ($Si_3N_4$) and silicon carbide (SiC) layers can be applied over the BN layer.

The next step 120 includes infiltrating the coated turbine blade preform by introducing a carbon-containing slurry, typically including a polymer which is a carbon yielding polymer, carbide powder and other powders as is known in the art, into the porosity of the coated turbine blade preform. The next step 130 includes further infiltrating the turbine blade preform with at least silicon, and preferably boron doped silicon, through an MI process, as known in the art, forming a SiC/SiC CMC turbine blade. In step 140, additional silicon is built up on the attachment location areas to construct the interface layer 38. Preferably, interface layer 38 is about 2 to about 16 mils thick, and even more preferably, interface layer 38 is about 2 to about 4 mils thick. This build up of silicon is preferably accomplished by melt infiltrating additional silicon to the desired attachment locations which yields SiC.

Figure 6:
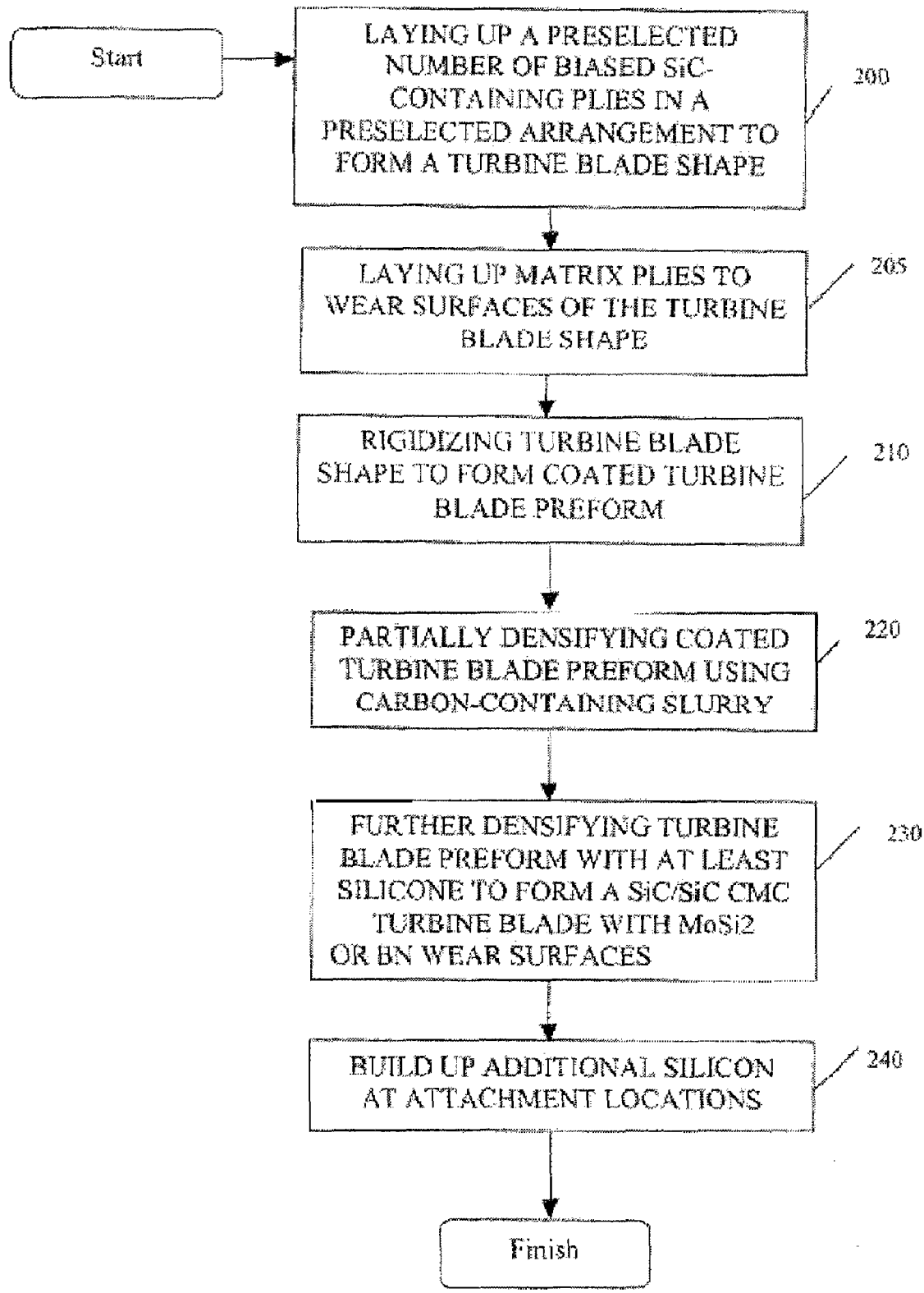
FIG. 6 is a flow chart illustrating an alternate slurry cast MI method of manufacture of the present invention to produce a CMC turbine blade with an integral interface layer.

Alternately, plies or tapes can be constructed, referred to as matrix tapes or matrix plies, which are applied to portions of the plies forming the preform to obtain the desired surface finish of the resulting component. In one embodiment of the present invention that is directed to turbine blades, referring to FIG. 6, step 200 includes both steps 100 and 120 of FIG. 5 as previously discussed. Preferably, in step 200 a preselected number of unidirectional prepreg ceramic fiber plies comprising coated prepreg ceramic fiber tows are used. Once step 200 is performed, step 205 includes laying up a matrix ply or plies over selected portions of the turbine blades to form wear surfaces of the turbine blade shape, although the matrix plies can be applied to overlay the entire outer surface of the turbine blade shape, if desired. Further, step 230 includes further infiltrating the turbine preform with at least silicon to form a SiC/SiC CMC turbine blade. However, due to the matrix ply construction, which can include silicon carbide powder and molybdenum powder or a combination thereof, the molybdenum and silicon react to form molybdenum disilicide ($MoSi_2$). The $MoSi_2$ is easier to machine, is less rigid, having a lower Young's modulus, and is more wear compatible. Alternately, in place of the silicon carbide powder in the matrix tape or ply, BN, Si-doped BN, Si$_3$N$_4$ or a combination thereof can be used. Due to the lubricity of BN, the wear surface is improved as the proportion of BN is increased. With these modified matrix plies, once processing has been completed, about 15 percent by volume is SiC, about 5 percent silicon by volume, with the remainder up to about 80 percent by volume of silicon metal, MoSi$_2$, BN and alloys thereof. In one embodiment, a gradient of silicon metal, MoSi$_2$, BN is achieved along the wear surface of the interface layer, and preferably a higher concentration of SiC faces toward the matrix side when compared to the outer side of the interface layer of the component.

It is to be understood that the above method can be used with existing CMC melt infiltration components.

In this manner, interface layer 38 is provided for components, such as composite turbine engine components. The silicon of interface layer 38 has a degree of hardness that is more compatible with adjoining metallic hardware or disks, thereby reducing wear. The silicon of interface layer 38 also provides a thickness of material that is compliant, thereby distributing the loadings between a large area of adjoining surfaces, such as from the mating surface 34 of disk 12 to the plies of a ceramic composite.

Figure 7:
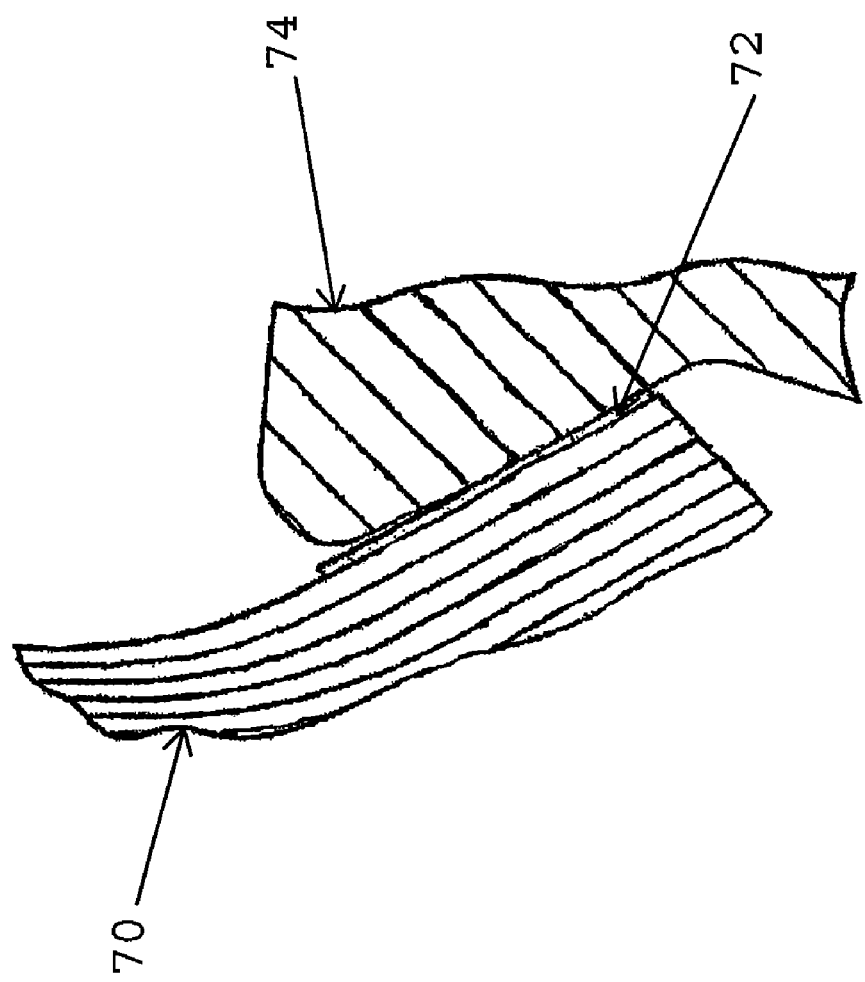
FIG. 7 is an exemplary enlarged sectional view of a gas turbine engine shroud incorporating an embodiment of the invention.
Figure 8:
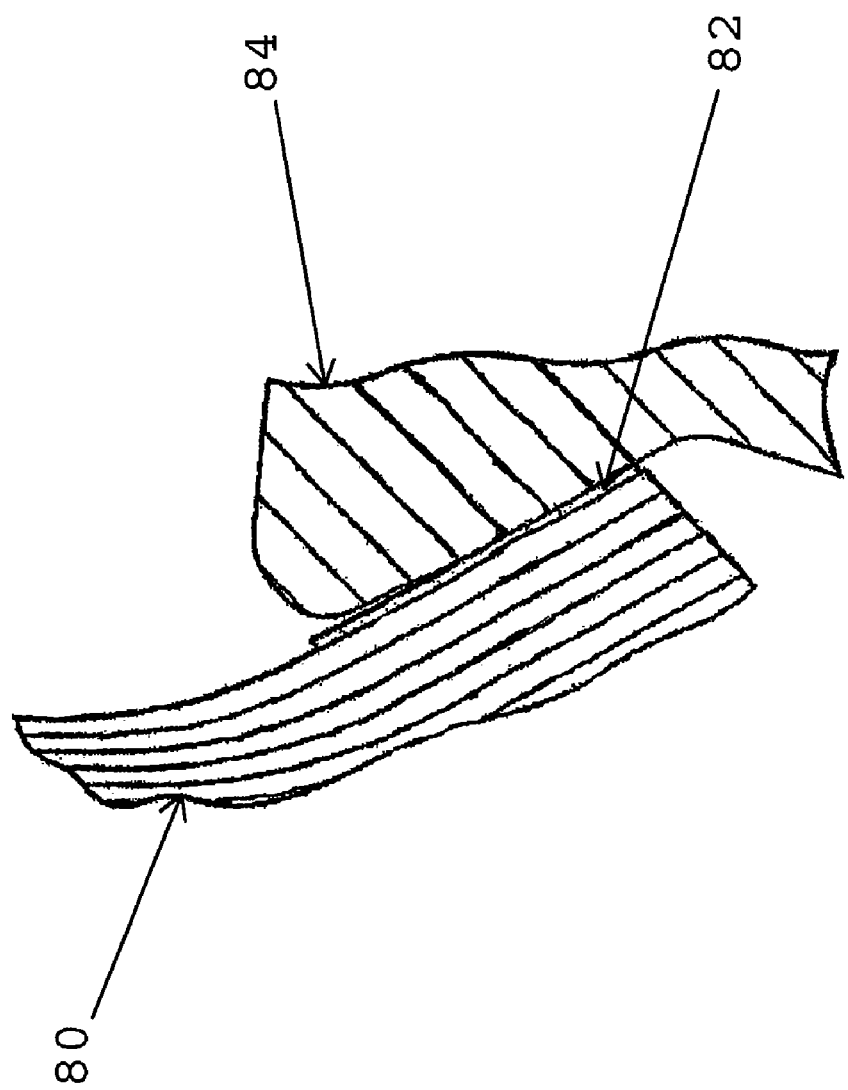
FIG. 8 is an exemplary enlarged sectional view of a gas turbine engine combustor liner incorporating an embodiment of the invention.

It is appreciated that the interface coating 38, as described herein, reduces the relative wear experienced at contacting surfaces, and hence, reduces the need for wear coatings, although the dovetail slot 14 may be wear coated at mating surface 34 to provide a sacrificial layer to reduce wear on disk 12. The present invention may also be applied to attachment locations for ceramic composites such as shrouds or combustion liners, or any other appropriate location that would benefit from a compliant layer with the benefits described herein. An exemplary gas turbine shroud 70 is shown at FIG. 7. As can be seen in FIG. 7, the shroud 70 includes an interface layer 72 at the attachment point between the shroud 70 and a second gas turbine component 74. An exemplary gas turbine combustor liner 80 is shown at FIG. 8. As can be seen in FIG. 8, the combustor liner 80 includes an interface layer 82 at the attachment point between the combustor liner 80 and another gas turbine component 84. Additionally, the wear surfaces can in addition to contact surfaces between different components, but can also include lining apertures used for structural fasteners.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A component for use in a heated environment comprising:
    a body composed of a ceramic matrix material, the body including an attachment location, the attachment location defining at least a portion of a surface of the component, and the attachment location being configured to be adjacent a second component during exposure in a heated environment; and
    an interface layer defining at least a portion of the surface of the attachment location and having a matrix side and an outer side, wherein the interface layer is interposed between the body and the second component during exposure in the heated environment, the matrix side of the interface layer being metallurgically bonded to the body;
    wherein the interface layer consists of silicon and a material selected from the group consisting of silicon carbide, boron nitride, molybdenum disilicide, and alloys thereof.

2. The component of claim 1, wherein the component is a turbine engine component.

3. The component of claim 2, wherein the component is a turbine blade.

4. The component of claim 2, wherein the component is a shroud.

5. The component of claim 2, wherein the component is a combustor liner.

6. The component of claim 1, wherein the ceramic matrix material is silicon carbide.

7. The component of claim 1, wherein the interface layer is a gradient layering of silicon carbide and silicon wherein the interface layer is composed of a greater amount of silicon toward the outer side when compared to the matrix side.

8. The component of claim 1, wherein the interface layer is a gradient layering of silicon carbide, silicon, boron nitride and molybdenum disilicide wherein the interface layer is composed of a higher concentration of silicon carbide toward the matrix side when compared to the outer side.

9. The component of claim 1, wherein the outer side of the interface layer provides a surface that has a lesser degree of hardness than a surface of the body.

10. The component of claim 1, wherein the interface layer distributes operating loads between the body and the second component over a large area.

11. The composite turbine engine component of claim 1, wherein the interface layer is formed on a composite surface by chemical bonding.

* * * * *